United States Patent [19]
Cakmakci

[11] Patent Number: 5,108,681
[45] Date of Patent: Apr. 28, 1992

[54] DECORATIVE PLASTIC TRIM STRIP AND METHOD AND APPARATUS FOR FORMING

[75] Inventor: Mehmet Y. Cakmakci, Rochester Hills, Mich.

[73] Assignee: Aeroquip Corporation, Maumee, Ohio

[21] Appl. No.: 397,965

[22] Filed: Aug. 24, 1989

[51] Int. Cl.⁵ .................. B32B 31/18; B60R 13/04
[52] U.S. Cl. .................. 264/151; 156/267; 264/163; 264/177.1; 428/31
[58] Field of Search .......... 428/31; 156/267; 264/151, 241, 163, 177.1

[56] References Cited

U.S. PATENT DOCUMENTS

| | | | |
|---|---|---|---|
| 3,359,030 | 12/1967 | Newman | 428/31 X |
| 3,388,523 | 6/1968 | Evans | 428/31 X |
| 3,451,709 | 6/1969 | Swauger | 428/31 X |
| 3,506,294 | 4/1970 | Newman | 428/31 X |
| 3,897,967 | 8/1975 | Barenyi | 428/31 X |
| 3,959,538 | 5/1976 | Loew | 428/31 |
| 4,154,893 | 5/1979 | Goldman | 264/327 X |
| 4,160,052 | 7/1979 | Krysiak et al. | 428/31 |
| 4,174,986 | 11/1979 | Jennings | 428/31 X |
| 4,358,482 | 11/1982 | Jubelt | 428/31 X |
| 4,364,789 | 12/1982 | Moran | 438/31 X |
| 4,489,019 | 12/1984 | Takeda et al. | 264/26 |
| 4,546,021 | 10/1985 | Mears | 428/31 |
| 4,579,755 | 4/1986 | Takeda et al. | 428/31 |
| 4,617,209 | 10/1986 | Ives | 428/31 |
| 4,619,847 | 10/1986 | Jackson | 428/31 |
| 4,719,067 | 1/1988 | Thiel | 264/259 |
| 4,722,818 | 2/1988 | Zoller | 428/31 X |
| 4,734,147 | 3/1988 | Moore | 156/267 X |
| 4,778,550 | 10/1988 | Barton et al. | 428/31 X |
| 4,808,450 | 2/1989 | Guy | 428/31 |
| 4,940,557 | 7/1990 | Kimura | 264/26 |
| 5,063,014 | 11/1991 | Cakmakci | 264/151 |

Primary Examiner—Henry F. Epstein
Attorney, Agent, or Firm—Emch, Schaffer, Schaub & Porcello Co.

[57] ABSTRACT

An improved decorative automotive vehicle trim strip and method and apparatus for forming are provided by reshaping an end of a previously extruded length of thermoplastic material. The surface of the length of thermoplastic material intended for viewing is maintained at a cold temperature, well below the softening point of the thermoplastic material, during the reshaping operation. The length of thermoplastic material is heated during reshaping by a mold section heated to 400° to 410° F. pressed against the surface intended to be affixed to the vehicle.

9 Claims, 9 Drawing Sheets

DECORATIVE PLASTIC TRIM STRIP AND METHOD AND APPARATUS FOR FORMING

BACKGROUND OF THE INVENTION

1. Field of the Invention

The present invention relates to a plastic trim strip of the type used on automative vehicles and to a method and apparatus for forming such trim strips.

2. Description of Related Art

Decorative trim strips are widely used to enhance the appearance of automotive vehicles. Typically, such trim strips are manufactured by a process which includes extrusion of a thermoplastic strip of a single unitary plastic material or multiple plies of different types or colors of plastic materials. Decorative plastic or metallic film may also be applied to the viewing surface of such trim strips.

As will be appreciated by those skilled in the art, the extruded plastic material, when cut to a desired length, will have the cut end exposed throughout the cross section of the strip. In the extrusion operation it is possible to obtain any one of a wide variety of surface appearances of the strip as extruded ranging from dull, to matted, to textured or to glossy, depending upon the type of extrusion die and operating conditions. This is well known in the art and does not form a part of the present invention. However, the surface appearance as extruded will usually be different from the surface appearance of an end cut through the cross section of the strip. The difference in appearance between a surface as extruded and a surface of such cut end is magnified in those instances in which a foam plastic strip is extruded as the cellular structure of the foam will be visible on such cut end while the surface as extruded may have a non-cellular or solid structure. Thus, for aesthetic purposes it is not desirable to have an end which is cut through the cross section of the extruded length of plastic exposed to view and much effort has been devoted to providing an end finish to such strips which is aesthetically pleasing in appearance. Frequently, it is desired that the strips terminate in tapered or pointed ends. However, whether such ends are tapered, pointed or some other configuration, it is desirable that no portion of the interior cross section of the strip be exposed and that only the decorative surface be exposed to view when the strip is attached to a vehicle.

Additionally, in many instances the surface appearance of the side of the extruded strip intended to face the vehicle is different from that of the surface intended for viewing. This is particularly true in those strips having multiple layers with the decorative layer intended for viewing having a different color than the base layer forming the side intended to face the vehicle. In those types of strips, it is commercially unacceptable for base layers to be visible when the strip is affixed to a vehicle.

Finished trim strips may be attached to a vehicle by any one of a number of means well-known to those skilled in the art. One such attachment means is a double-faced adhesive foam core strip, one side of which is attached to the vehicle and the other side of which contacts the surface of the trim strip facing the vehicle (i.e., the surface opposite the decorative viewing surface).

Numerous methods have been utilized in the past to provide decorative strips having aesthetically pleasing end portions; however, none of these have the combined advantages of aesthetics and cost economies which result from the present invention. For example, U.S. Pat. No. 4,489,019 and its divisional U.S. Pat. No. 4,579,755 disclose forming a longitudinal molding with non uniform sections. The process disclosed in such patents begins with an extrusion molded thermoplastic strip which is then reshaped to provide a remolded end portion. The extruded thermoplastic strip is placed into a mold, heated and partially fused by high frequency dielectric heating and then cooled in the mold so that the material is partially remolded. Preferably, the total volume of the whole material placed in the mold is equal to the volume of the cavity of the mold. The heated portions of the longitudinal strips are melted and flow along the surface of the cavity of each of the molds. Such patents also disclose reforming the strip around a separately molded clip which may be utilized to connect the part to the vehicle.

U.S. Pat. No. 3,959,538 discloses contoured end structures for trim strips formed from a length of extruded plastic material. The end structures have various configurations and are produced by removing a portion of the trim strip material as extruded between the side portions thereof to define a pair of V-shaped notches or recesses and then deforming the remaining portions of the trim strip adjacent the recess to close the recess and bring laterally opposite edges thereof into juxtapositional relationship. The juxtaposed edges are then bonded by heat sealing to complete the forming operation.

The method disclosed in U.S. Pat. No. 4,174,986 also begins with a length of extruded thermoplastic material such as polyvinylchloride (PVC) which is cut into segments of desired lengths. Under that invention an improved method for forming tapered ends is disclosed with the stated purpose of avoiding the tendency of the finished strip to delaminate from the substrate to which it is attached. Under that invention a V-shaped wedge is cut from an end of the strip thereby creating two similar triangular legs which are drawn together and adhered to create the pointed taper. The legs at the notched ends are bent upwardly approximately 45° to counteract the tendency of the end to arch after the taper is formed.

The inventions disclosed in U.S. Pat. Nos. 4,617,209, 4,619,847 and 4,719,067 utilize separately molded end caps which are separately adhered or otherwise affixed to the trim strip to provide for the decorative end portion of the finished article.

With the exception of U.S. Pat. Nos. 4,489,019 and 4,579,755 the above-identified prior art involves costly operations of either cutting and adhering or of separately molding an end cap and adhering or otherwise connecting it to the extruded strip. Additionally, strips formed according to those inventions suffer from an aesthetic standpoint in that the parting line between the connected members is visible on the viewing surface of the finished part unless an additional decorative layer of film such as Mylar plastic or metallic foil is applied thereover.

Similarly, there is no indication in U.S. Pat. Nos. 4,489,019 and 4,597,755 that any effort is made to deal specifically with finishing the end portions as proposed in the present invention. Although parts produced according to the invention disclosed in U.S. Pat. Nos. 4,489,019 and 4,597,755 may not have a parting line on the viewing surface, the method utilized therein results in remelting the entire mass of the strip portion intended to be remolded so that all portions "... are melted and flow along the surface of the cavity of each of the molds." (See U.S. Pat. No. 4,489,019, column 4, lines 13 and 14). Such remelting and flowing of the melted surface results in the surface having an appearance different from that of the surface as extruded.

SUMMARY OF THE INVENTION

According to the present invention, the end portion of a length of extruded plastic strip is reshaped to a desired contour in a manner which permits the exterior surface intended to be viewed when the completed part is affixed to a vehicle (i.e., the viewing surface) to be reshaped along with the main structural portion of the extruded strip but to do so without melting or otherwise altering the surface appearance of such viewing surface as originally extruded. This is accomplished by maintaining the surface intended to be viewed against a contoured mold face maintained at a relatively cold temperature, well below the melting point of the plastic forming such viewing surface, heating to the melting temperature a major mass of that portion of the extruded strip intended to be reshaped by moving a heated mold against the surface intended to face the vehicle, squeezing such portion between the cold contoured mold face and the heated mold and cooling such portion until it is set in conformity with said contoured mold face.

The volume of the mold cavity formed by the contoured mold face and the heated mold when closed is slightly less than the volume of the portion of the extruded strip intended to be reshaped. Accordingly, waste material or flash will be formed during the reshaping step and will be trimmed, preferrably during the reshaping operation, or otherwise removed from the reshaped strip. Additionally, according to one embodiment, a portion of the excess volume of plastic may be forced into a frusto-conical or other shaped recess in the heated mold to form, during the reshaping step, a retaining stud which extends from the surface intended to face the vehicle.

Accordingly, it is an object of the present invention to form a trim strip having a finished end of different contour from that of a cut end of the originally extruded strip.

It is another object of the present invention to provide a new and novel trim strip and method and apparatus for reshaping an extruded length of plastic into such trim strip such that only the surface as originally extruded is visible when the finished strip is affixed to a vehicle.

It is a further object of the present invention to provide a method for forming and reshaping the end portion of an extruded strip to form an aesthetically pleasing end portion in which there is no parting line in the viewing surface between the main strip portion and the reshaped end portion.

It is a further object of the present invention to provide a method and apparatus for producing a trim part from an extruded strip having first and second layers of material such that only one layer of such material is visible when the part is affixed to a vehicle.

It is another object of the present invention to provide a new trim strip having enhanced aesthetics.

It is yet another object of the present invention to provide a trim strip having an integral retaining stud extending from the surface of the reshaped portion intended to face the vehicle and to a method and apparatus for forming such retaining stud as part of the reshaping operation.

It is a further object of the present invention to provide an apparatus reshaping a length of extruded plastic material into an article having an enhanced visual appearance.

It is another object of the present invention to provide a method and apparatus for forming an aesthetically pleasing end on the cut end of a length of plastic material.

DESCRIPTION OF PREFERRED EMBODIMENT

Figure 1A:
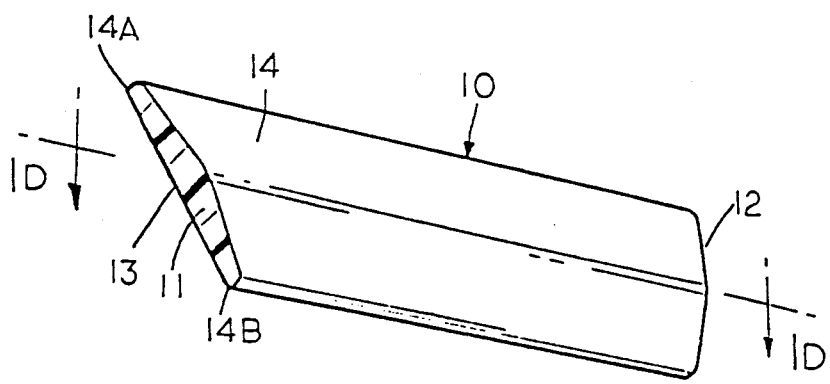
FIG. 1A is a perspective view of a strip of thermoplastic material as extruded and cut to the desired length for reshaping one or both ends.
Figure 1D:
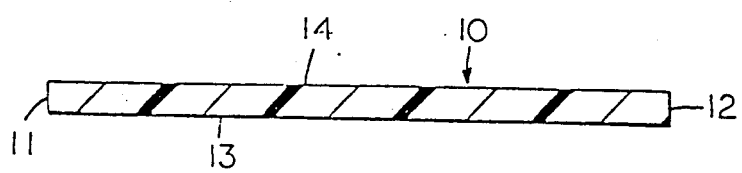
FIG. 1D is a sectional view taken through line 1D—1D of FIG. 1A.

Referring now to FIG. 1A, there is shown a strip 10 of thermoplastic material as extruded from a conventional extrusion device well known in the art. The plastic material is preferably polyvinylchloride (PVC) but it could also be a wide variety of other plastic materials. The strip 10 has been cut to a desired length and has end portions 11 and 12. Pursuant to the present invention, one or both ends of the strip 10 may be reshaped to form a finished trim strip. The finished trim strip 10C as shown in FIG. 1C has had only one end reshaped. The strip 10 as extruded is contoured with a back or inner surface surface 13 which is relatively flat and an outer surface 14, which may have one of a wide variety of cross-sectional configurations. In the strip shown in FIG. 1A, the outer surface 14 has a rounded configuration when viewed in cross section. As such, the outer surface 14 extends the full distance from its intersection with one edge of the inner surface 13 as at point 14A to its intersection at the opposite edge as at 14B.

In most instances, it is aesthetically undesirable for the finished trim strip to abruptly terminate in a raw cut end. Rather, it is desirable that the end be shaped to an aesthetically pleasing configuration such as a tapered end 16 which is disposed at an obtuse angle to the longitudinal axis of the strip 10 and extends to a leading edge 17 as shown in FIG. 1C or other desired configuration.

Figure 1B:
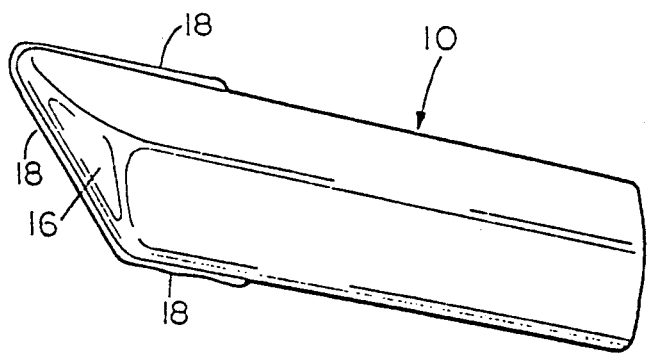
FIG. 1B shows the strip of FIG. 1A after reshaping but before removal of flash.
Figure 1C:
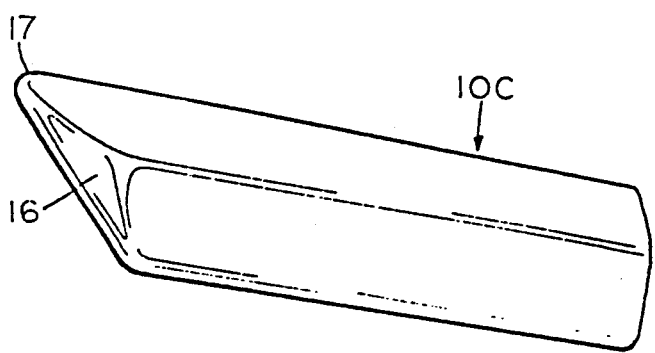
FIG. 1C is a view similar to FIG. 1B showing the finished trim strip after removal of flash.

As can be seen in FIG. 1B and as will be appreciated from a detailed description of the reshaping apparatus, the end of the strip 10 which is reshaped to form the tapered end 16 or other desired configuration, will have flash or waste material 18 resulting from the reshaping step. Following removal of the flash 18, the finished decorative trim strip 10C results as shown in FIG. 1C. Preferably, the flash 18 will be separated or substantially separated from the strip 10 during the reshaping operation.

The strip 10 of FIG. 1A is shown with the end portion 11 cut at an angle relative to the longitudinal axis approximating the angle of the tapered end 16 of the finished trim strip 10C shown in FIG. 1C. Although it would be possible to form the finished trim strip 10C from a length of material cut at right angles to the direction of extrusion, to do so would result in an increased amount of flash 18 if it is desired that the finished trim strip have a tapered end such as that shown at 16 in FIG. 1C.

Referring now to FIGS. 2A, 2B, 2C and 2D and FIGS. 4A, 4B, 4C, 4D and 4E, it is frequently desired to have a trim strip formed with a layer of a different type or color of plastic material having an enhanced aesthetic appearance from that of the material used for the main portion of the extruded strip. Thus, as shown, there is provided a strip generally designated in FIG. 2A by the numeral 20 having ends 21 and 22 and in FIG. 4A by the numeral 40 having ends 41 and 42. The strips 20 and 40 are formed of two different materials which are co-extruded and designated 23 as the inner or base layer and 24 as the outer aesthetic layer intended to be viewed when the finished part is attached to a vehicle. The outer layer may also be PVC but one which is colored and formulated to have an enhanced aesthetic appearance such as one with a high gloss or a matted finish. As such, the outer layer 24 may be formed from a more expensive material than the inner core layer 23 which is not visible when the finished part is attached to a vehicle. Since the inner layer is intended to face the vehicle and be adhered or otherwise secured thereto by attachment means such as a double-faced adhesive foam core strip, it has a flat inner face 25. The material for the outer layer 24 must, of course, be compatible with the material from which the inner layer 23 is formed in order that the layers do not delaminate following either the extrusion or the reshaping.

Figure 2A:
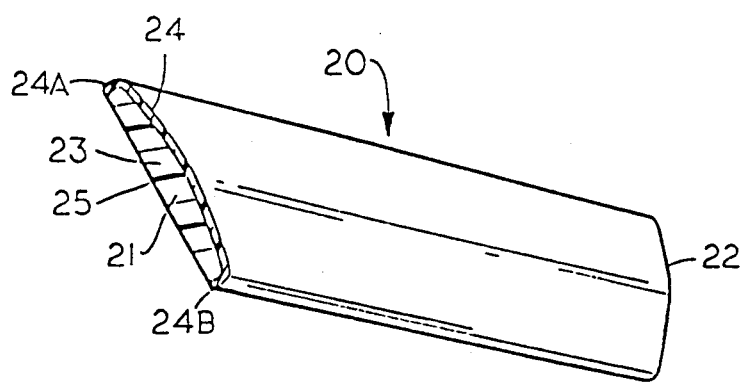
FIG. 2A is a view similar to FIG. 1A but showing a modified strip having, as extruded, a plurality of layers of thermoplastic material.
Figure 2B:
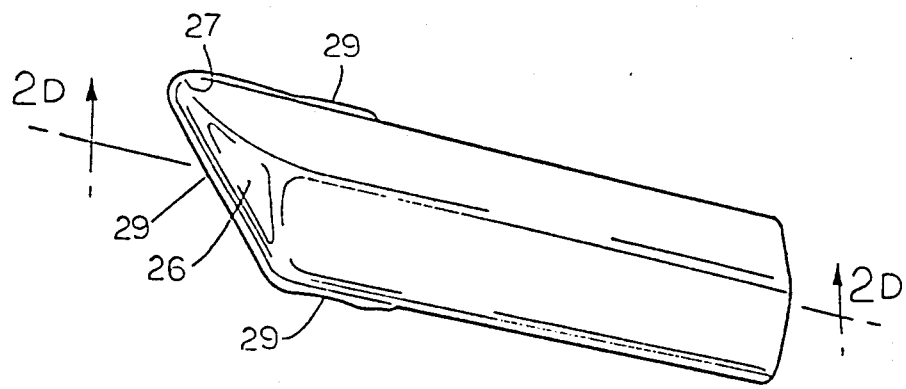
FIG. 2B shows the strip of FIG. 2A after reshaping but before removal of flash.
Figure 2C:
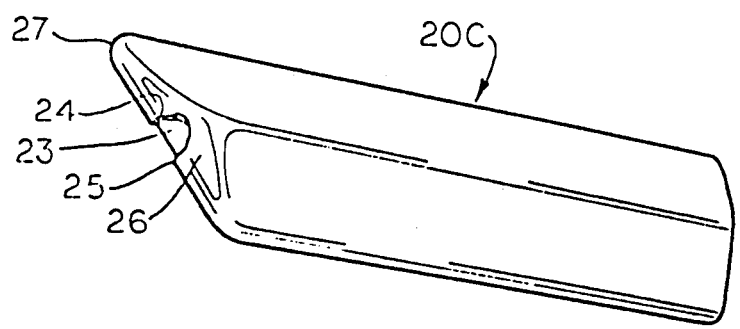
FIG. 2C is a view similar to FIG. 2B showing the finished trim strip after removal of flash with a fragmentary section taken from the outer layer.
Figure 2D:
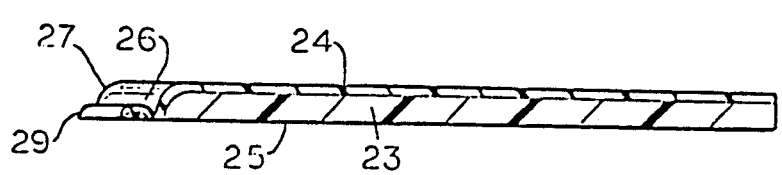
FIG. 2D is a sectional view taken through line 2D—2D of FIG. 2B.
Figure 4A:
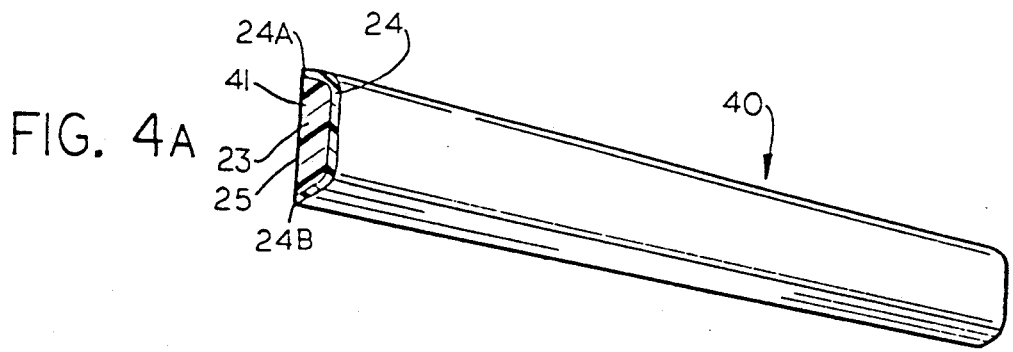
FIG. 4A is a view similar to FIG. 1A showing a strip having, as extruded, yet a different cross-sectional shape.

As can be seen from FIGS. 2A and 4A, the outer layer 24 extends from a point 24A of intersection with the substantially flat inner face 25 of the layer 23 to the opposite point 24B of intersection with such face. FIGS. 2B and 2C show the strip 20 of FIG. 2A after the reshaping operation with the finished trim strip 20C of FIG. 2C having a tapered end 26 which is disposed at an obtuse angle to the longitudinal axis of the strip 20 and extends to a leading edge 27. As in the case of the embodiment of FIGS. 1A, 1B, 1C and 1D, the extruded strip 20 has been cut so that its end 21 is at an angle relative to the longitudinal axis approximating the angle of the end 26 of the finished trim strip 20C shown in FIG. 2C. As can be seen from FIGS. 2C and 2D following reshaping, the outer layer 24 extends around the end 21 completely to the inner face 25. This is further illustrated in FIGS. 2B and 2D which show the waste or flash 29 resulting from the reshaping. The significance and importance of this is that the outer layer 24 having enhanced aesthetic appearance must extend, following reshaping, substantially completely to the inner face 25 of the inner layer 23 intended to contact the vehicle that the aesthetically appearing outer layer 24 will be primarily visible when the finish strip 20C is affixed to a vehicle.

Figure 4B:
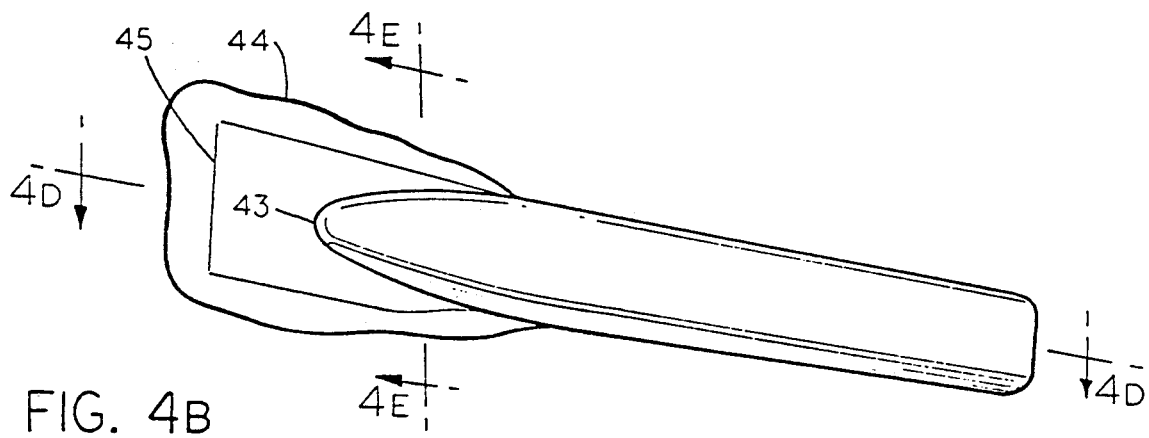
FIG. 4B shows the strip of FIG. 4A after reshaping but before removal of flash.
Figure 4C:
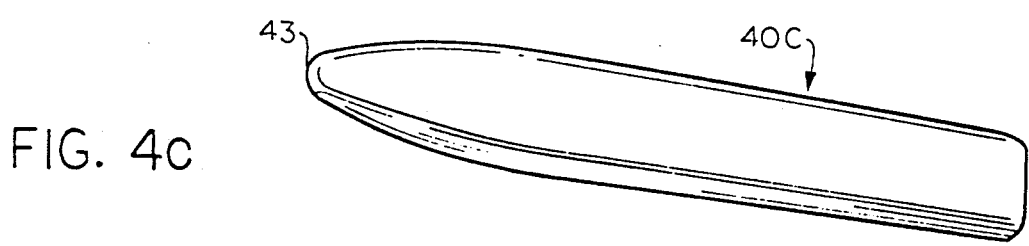
FIG. 4C is a view similar to FIG. 4B showing the finished trim strip after removal of flash.

FIGS. 4B and 4C show the strip 40 of FIG. 4A after a reshaping operation according to a modified embodiment to be described in connection with FIG. 13. The finished trim strip 40C of FIG. 4C tapers to a point 43 lying on the longitudinal axis. In order to form a finished trim strip 40C tapering to a point 43, it is most expedicious to cut the strip 40 so that the end 41 is perpendicular to the longitudinal axis; however, it could be cut with a pointed end approximating the taper of the finished trim strip.

Figure 4D:
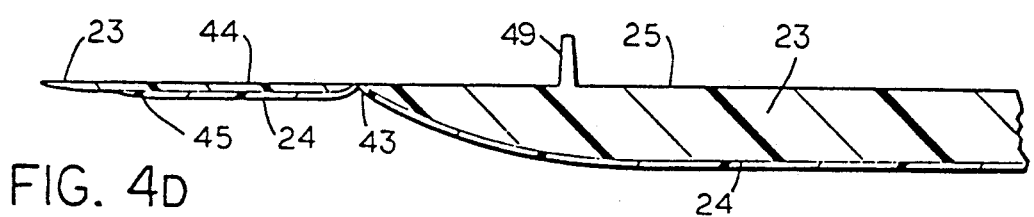
FIG. 4D is a sectional view taken through line 4D—4D of FIG. 4B.
Figure 4E:
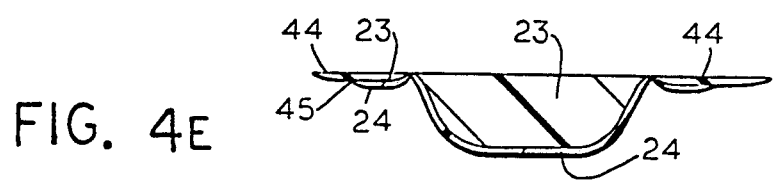
FIG. 4E is a sectional view taken through line 4E—4E of FIG. 4D.
Figure 5:
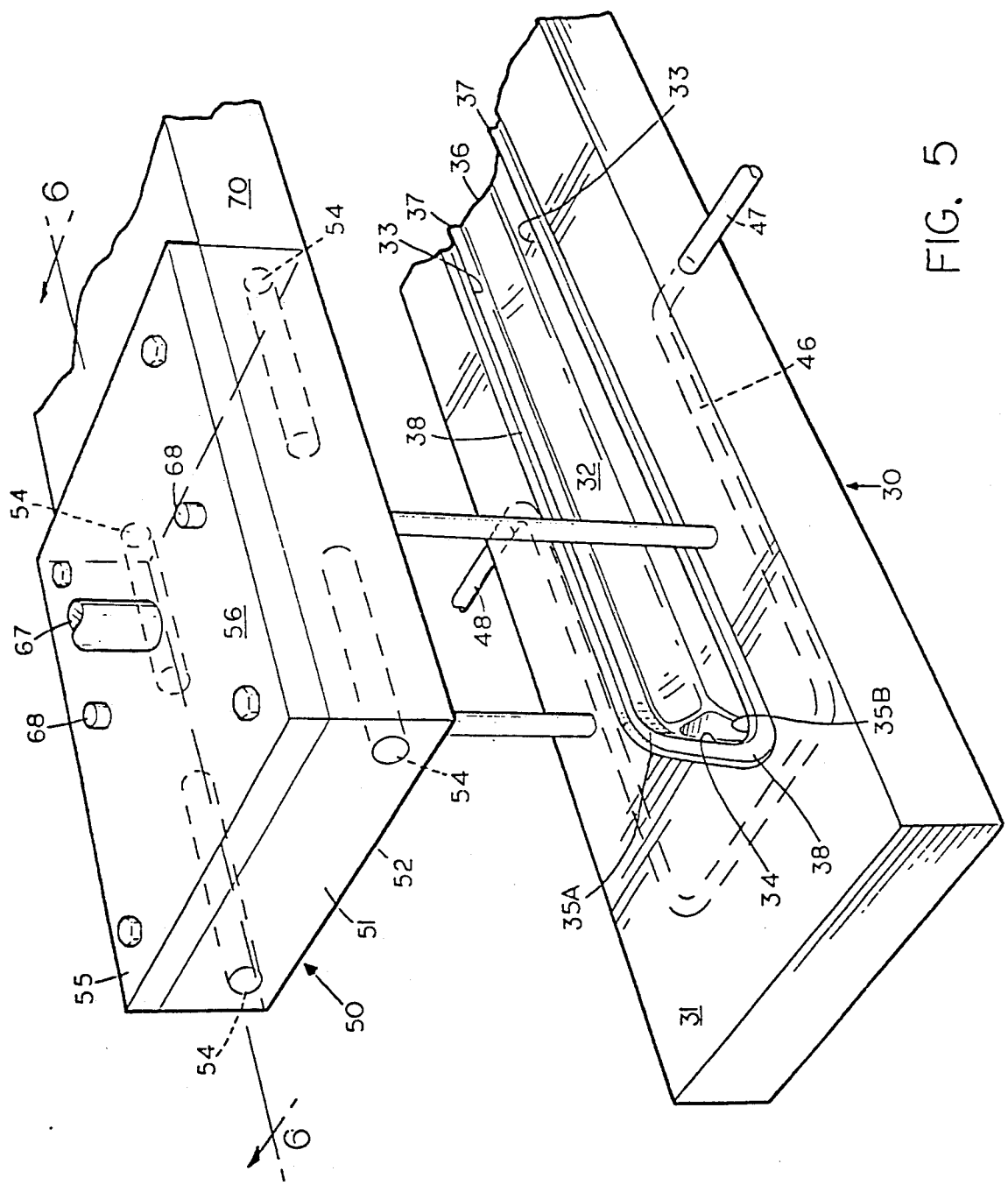
FIG. 5 is a schematic view in perspective showing apparatus for reshaping the strip as extruded and cut.

Similarly, FIGS. 4B, 4C, 4D and 4E show the reshaped strip 40 before and after removal of flash 44 to form the finished trim strip 40C with the outer layer 24 extending to the inner face 25 throughout the peripheral extent of the reshaped end terminating at the point 43. FIGS. 4B, 4D and 4E also show a line of demarcation 45 in the flash 44 between that originating with the inner layer 23 and that originating with the outer layer 24.

FIG. 4D also shows an integrally formed retaining stud 49 extending from the inner face 25.

Figure 3A:
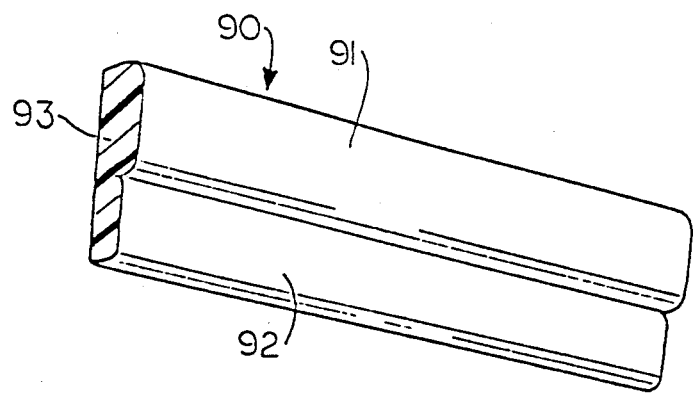
FIG. 3A is a view similar to FIG. 1A showing a strip having, as extruded, a different cross-sectional shape.
Figure 3B:
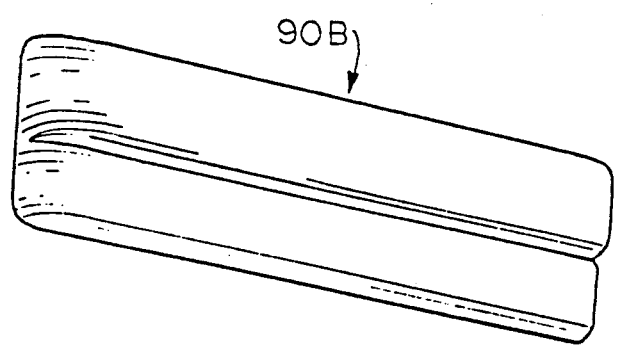
FIG. 3B shows the strip of FIG. 3A after reshaping and removal of flash.

FIG. 3A shows a modified strip 90 as extruded. The strip 90 has an upper portion 91 of predetermined thickness and a lower portion 92 of significantly lesser thickness. It has an end 93 which has been cut substantially perpendicular to the axis of extrusion. FIG. 3B shows the modified strip of FIG. 3A after reshaping and trimming to form a finished trim strip 90B. Such reshaping causes the outer surfaces of the upper portion 91 and the lower portion 92 to cover the cut end 93 and to form an aesthetically pleasing end on the finished trim strip.

Referring now to FIGS. 5-9, the apparatus for reshaping lengths of extruded plastic material into finished trim strips includes a first mold section 30 having a planar face 31 in which is formed a cavity 32 conforming to the desired contour of the end of the finished trim strip. In the embodiment illustrated in FIG. 5, the contour of the cavity 32 conforms to that of the finished trim strip 10C illustrated in FIG. 1C and 20C illustrated in FIG. 2C. As such, it has a pair of parallel sides 33 which extend to a tapered end wall 34 and joined thereto by a pair of arcuate segments 35A and 35B. The arcuate segment 35B forms the leading edge 17 of the finished trim strip 10C. The opposite end 36 of the cavity is open and has a contour substantially matching that of the outer surface 14 of the strip 10 as extruded.

The upper peripheral edge of the cavity 32 is defined by a knife edge 37 lying in or slightly above the plane of planar face 31. Outwardly from the knife edge 37 is a channel 38 intended to receive excess or waste material which results from the reshaping operation forming the flash 18.

It is desired that the first mold section 30 be maintained at a temperature well below that of the softening or melting point of the plastic material and ideally at a temperature of approximately 140° F. or lower. Accordingly, there is provided a cooling passageway 46 for receiving cooling water or other cooling medium from an inlet pipe 47. An outlet pipe 48 is provided to discharge the cooling water from the passageway 46.

Positioned directly above the first mold section 30 is a second mold section 50. The second mold section 50 has a lower member 51 having a flat or planar molding face 52 facing the planar face 31 and contoured cavity 32 of the first mold section 30. The lower member 51 may be heated by means well known in the molding art such as conventional cartridge heaters 54 positioned near each of the four corners. The cartridge heaters are connected to a temperature control means (not shown) which maintain the temperature of the lower molding member 51 during the reshaping step above the melting temperature of the plastic material. For reshaping PVC, it is desired that the temperature of such lower member 51 be maintained between 400°-410° F. to effectively heat the strip 20 to a temperature conducive to reshaping. As is well known in the art, PVC is subject to thermal degradation if it is heated at excessively high temperatures for extended periods of time. It has been found that maintaining the temperature of the lower member 51 between about 400°-410° F. permits the reshaping operation to be completed effectively without causing thermal degradation to the PVC material.

Following the reshaping operation, it is desired that the second mold section 50 be cooled to approximately 140° F. in order to make certain the finished trim strip is fully set prior to opening the mold sections 30 and 50. Accordingly, means are provided for cooling the lower member 51 of the second mold section 50. In order to accomplish this, the second mold section 50 also includes an upper cooling member 55 having a plate 56 from which a plurality of baffles 57 depend. The lower member 51 has a rectangular cavity 59 formed therein. The plate 56 and baffles 57 of the cooling member 55 are sized so that the baffles 57 will be positioned in the cavity 59 of the lower molding member 51 when the plate 56 of the cooling member 55 is engaged to the top of the lower member 51. The cooling member 55 may be secured to the lower member 51 by a plurality of bolts 60, one at each corner for securing the cooling member 55 to the lower member 51.

The lower member 51 has a passageway 62 with an inlet pipe 63 connected thereto for introducing cold air or other cooling medium into the cavity 59 at such time in the operation when it is desired to cool and set the reshaped part. An outlet passageway 64 and outlet pipe 65 communicate with the cavity to remove the cooling medium therefrom. As will be appreciated by those skilled in the art, the presence of the baffles 57 will serve to direct the flow of the cooling air or other cooling medium through the cavity 59.

Means are provided for moving the second mold section 50 into and out of engagement with the first mold section 30. Such means include a rod 67 connected to a hydraulic cylinder or other power means (not shown). The second mold section 50 is guided during its movement to and away from the first mold section 30 by means of a pair of vertical guide pins 68 extending through a pair of passageways 69 extending through both members of the second mold section 50 and secured to the first mold section 30.

Also provided as part of the molding mechanism is an upper hold-down plate 70. The hold-down plate may be moved by means not shown from an upper position out of engagement with the first mold section 30 to a lower position in engagement with such lower mold section 30. It is located at a position above the contoured cavity 32 which is in an area not intended to be heated or to have the length of plastic material reshaped. As such, the hold-down plate 70 is neither heated nor cooled and simply functions to assist in securely holding the extruded plastic strip 10 in the contoured cavity 32 during the reshaping step.

The operation of the apparatus will be described in reshaping a strip 20 of the type shown in FIGS. 2A, 2B, 2C and 2D which has a plurality of layers of thermoplastic material.

The strip 20 intended to be reshaped is positioned in the cavity 32 of the first mold section 30. As can be seen from FIG. 6, the end 21 of the portion intended to be reshaped extends beyond the end 34 of the cavity and rests on the knife edge 37. Cooling water or other cooling medium is flowed through the passageway 46 throughout the reshaping operation in order to maintain the outer surface of the outer layer 24 well below the softening temperature of the PVC or other plastic forming such layer. Preferably, the temperature of the face of the contoured cavity should be maintained at approximately 140° F.

Figure 6:
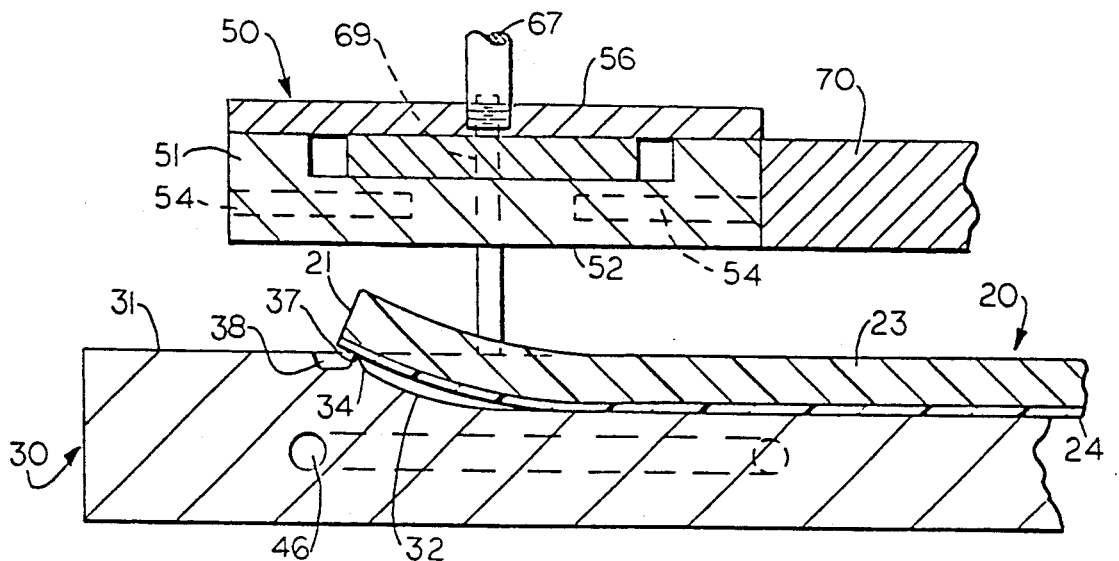
FIG. 6 is a sectional view taken through line 6—6 of the apparatus of FIG. 5 showing a strip positioned therein prior to reshaping.
Figure 7:
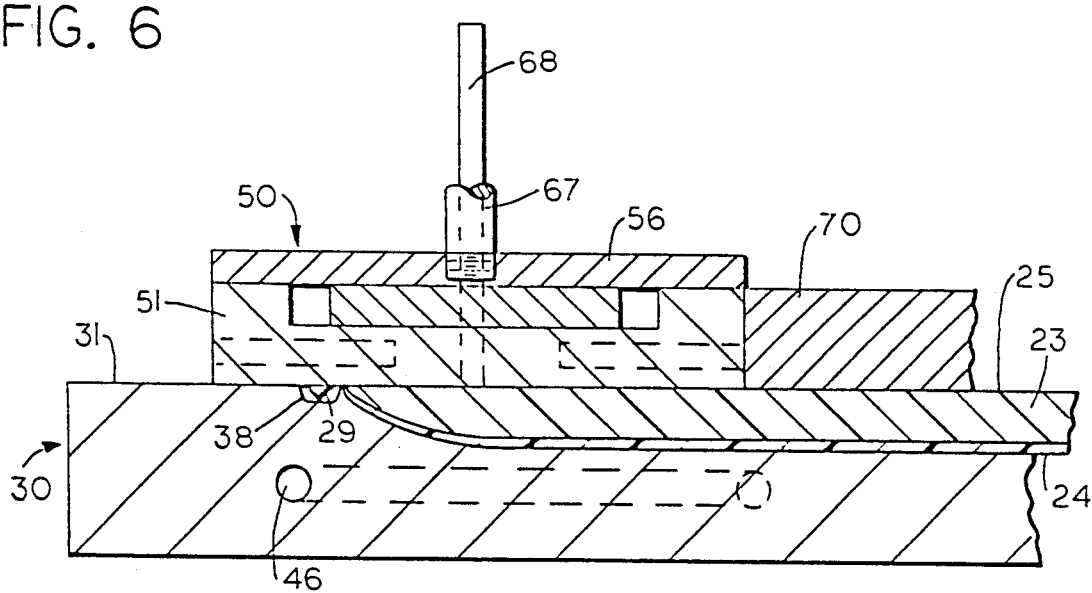
FIG. 7 is a view similar to FIG. 6 showing the apparatus in closed reshaping position.

With the strip 20 so positioned, the second mold section 50 is lowered from the position shown in FIG. 6 to the position shown in FIG. 7 while being heated by the cartridge heaters 54 to a temperature above the melting point of the plastic material forming the first layer 23 in order to heat such first layer 23 to a temperature at which it may be permanently deformed. As previously noted, for reshaping strips of PVC, the temperature of the lower member 51 of the second mold section should be maintained at 400° to 410° F. The second mold section 20 is forced downwardly into engagement with the strip 20 and the first mold section 30 by power means (not shown) connected to the rod 67 to provide sufficient pressure which, coupled with the heat and softening of the plastic material, will cause the strip 20 to be reshaped to conform to the cavity 32. Any excess material resulting from such reshaping will be forced into the overflow channel 38. If there is excess waste material beyond the capacity of the channel 38, it will be forced between the planar face 31 of the first mold section 30 and the face 52 of the lower member 51. Preferably, the overflow channel 38 has the capacity for receiving all of the waste material.

At the same time or, preferably, immediately before the second mold section 50 is lowered into engagement with the first mold section 30, the hold-down plate 70 is lowered into engagement with the first mold section 30 and the strip 20 to hold the strip 20 snuggly in the cavity during the reshaping operation.

Figure 8:
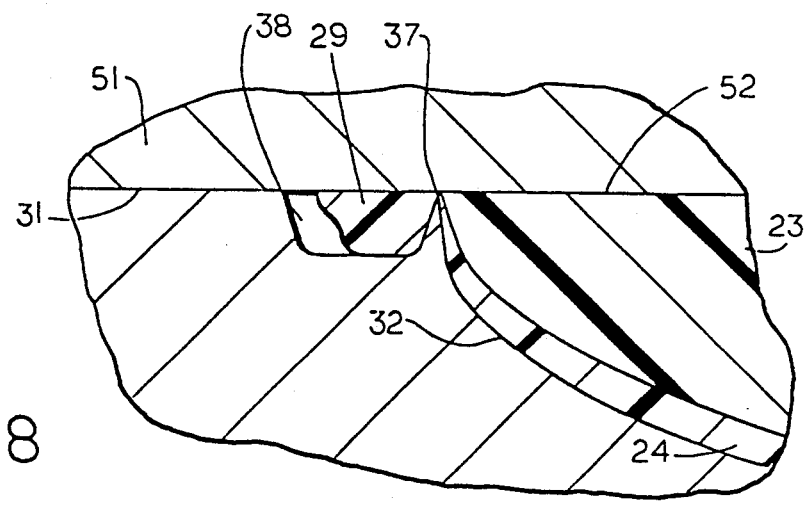
FIG. 8 is a fragmentary view, greatly enlarged, of that portion of FIG. 7 showing the reshaped end and the channel for receiving excess material.
Figure 9:
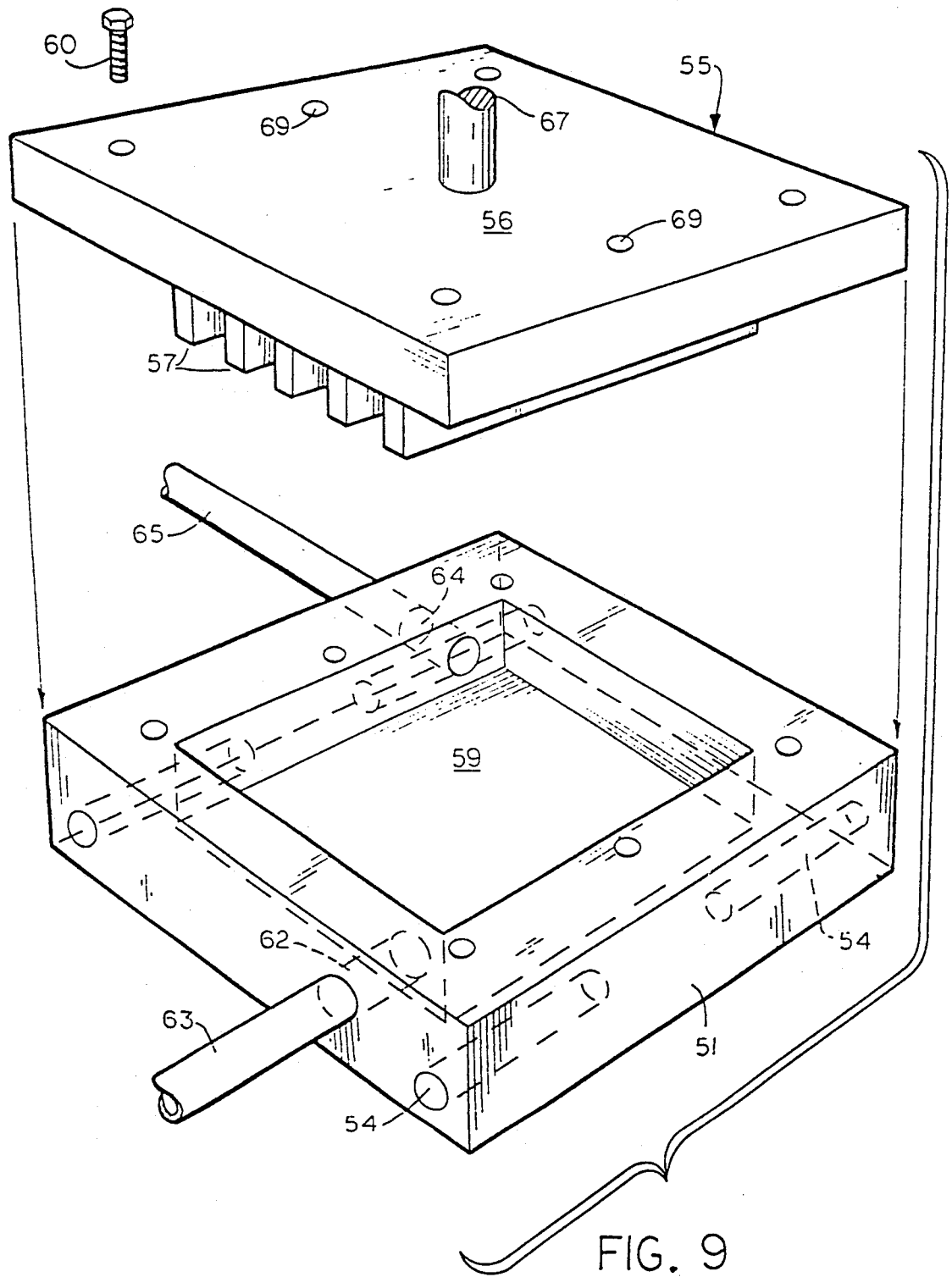
FIG. 9 is a schematic view in perspective showing details of the heating plate portion of the apparatus of FIG. 7.

As can be readily appreciated from FIGS. 7 and 8, the knife edge 37 becomes engaged by that part of the outer surface 24 of the strip 20 intended to be reshaped and, as the mold sections 30 and 50 close, the knife edge 37 forces that portion of such outer surface 24 against the face 52 of the lower member 51. Such action places those portions of such outer surface 24 in the same plane as inner face 25 of the strip and also severs or nearly severs the flash 29 from the reshaped strip.

Following reshaping, the cartridge heaters 54 are turned off and cooling air or other cooling medium is introduced into the inlet passageway 62 through the inlet pipe 63. Such cooling air flows through the passageways defined by the baffles 57 and out of the outlet passageway 64 and outlet pipe 65. This cooling step is continued until the finished part 20C has reached a temperature at which it is fully set.

It should be noted that because the outer surface of the outer layer 24 is continuously maintained at a temperature well below its softening temperature, it will maintain the appearance it had upon its initial extrusion. More importantly, the outer surface of outer layer 24 will be forced to a position against the molding face 52 of the lower molding member 51 by virtue of the knife edge 37 acting upon it during the reshaping step. The result of this will be to completely cover the reshaped end of the remolded part so that when the finished part is affixed to a vehicle with the inner surface adjacent the vehicle, the outer surface will be the only surface visible to the viewer.

Figure 13:
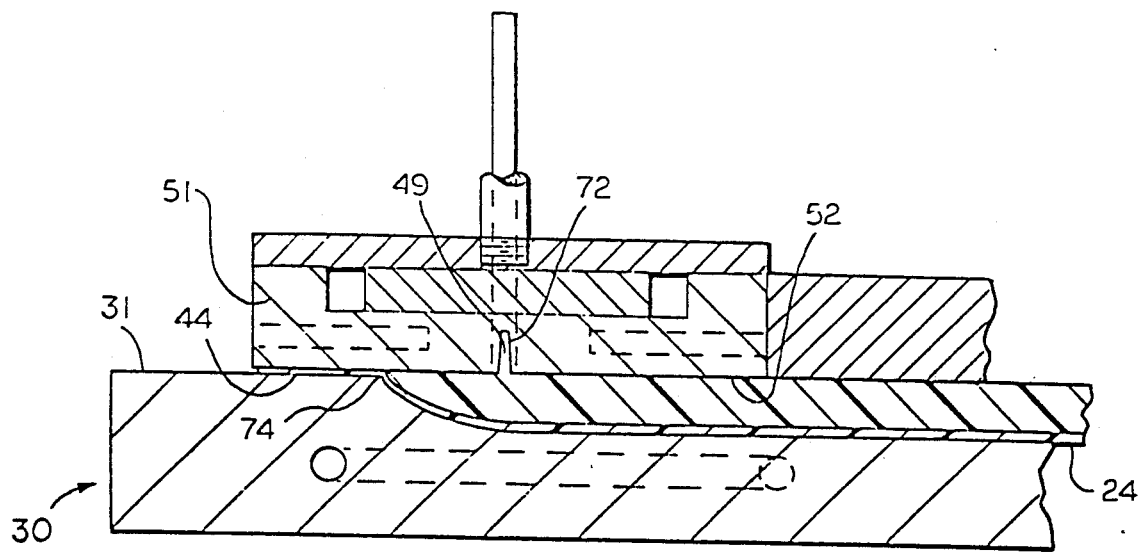
FIG. 13 is a view similar to FIG. 7 showing modified apparatus for forming a finished trim strip.

If desired and as shown in FIG. 13, a conical or other shaped recess 72 may be formed in the face 52 of the lower member 51 opposite a portion of the contoured cavity 32 in which the strip 20 is to be reshaped. In such embodiment, a portion of the excess plastic will be squeezed into the recess 72 during the reshaping operation to form a stud or retaining member 49.

Additionally, FIG. 13 shows a modified molding apparatus which is similar to the apparatus described in FIGS. 5-9 with the exception that there is no channel for receiving excess material squeezed from the cavity during the reshaping operation. Thus, while it is preferred to have a channel provided such as that indicated by the numeral 38 in FIGS. 5-9, the invention can be utilized to produce commercially satisfactory parts without the presence of any such overflow channel.

Thus, as shown in FIG. 13, the cavity terminates at its upper peripheral edge in a sharp point 74 lying in the same plane as the planar face 31 of the first mold section 30. During the reshaping operation, the outer surface of the outer layer 24 of the strip to be reshaped is moved by the sharp point 74 around the periphery of the contoured cavity 32 to a plane approximating that of the planar face 31 and the nearly adjacent face 52 of the lower member of the second mold section. Under this embodiment any waste or flash material 44 will simply be squeezed between the planar face 31 of such first mold section 30 and the face 52 of the lower member 51. Strips reshaped under this embodiment will not have the flash 44 completely severed from the reshaped article and a separate trimming operation will be required to remove the flash.

FIGS. 4B, 4C, 4D and 4E illustrate a strip which has been reshaped in accordance with the modified apparatus of FIG. 13. As can be seen in FIGS. 4D and 4E, the outer layer 24 extends well into the area of flash. As previously noted, FIGS. 4B, 4D and 4E show the line of demarcation 45 at which the outer layer 24 terminates in the flash and the inner layer 23 continues.

Figure 10A:
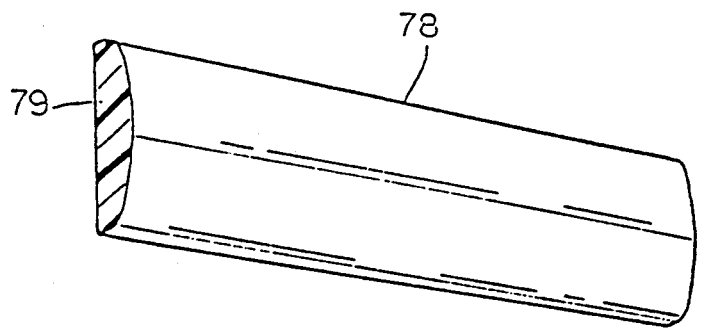
FIG. 10A is a perspective view of a strip as extruded and cut at right angles to the direction of extrusion preparatory to reshaping.
Figure 10B:
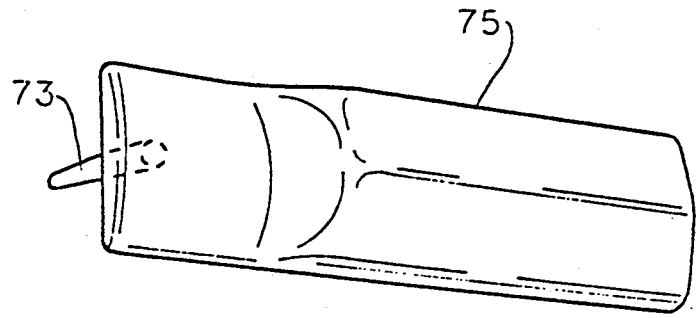
FIG. 10B is a perspective view showing a modified finished trim strip with a retaining stud after removal of flash reshaped from an extruded strip of the type shown in FIG. 10A.

Referring now to FIGS. 10A and 10B, there is shown a modified configuration of finished trim strip 75 which has been reshaped from an extruded strip 78 which has been cut with an end 79 perpendicular to the longitudinal axis. It has been reshaped in a mold having a cavity to form a stud 73 and has had the reshaped end formed to a significantly thinner thickness than the extruded strip.

Figure 11A:
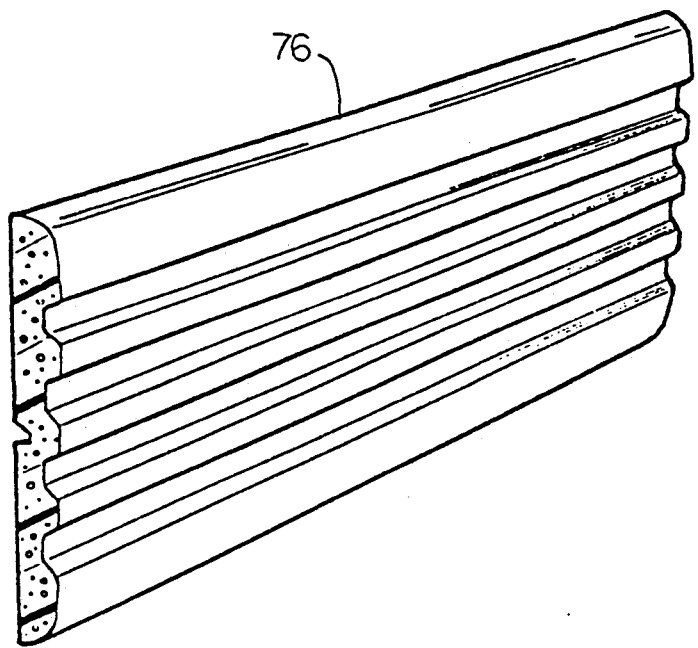
FIG. 11A is a perspective view of a different type and shape of strip as extruded and cut but prior to reshaping.
Figure 11B:
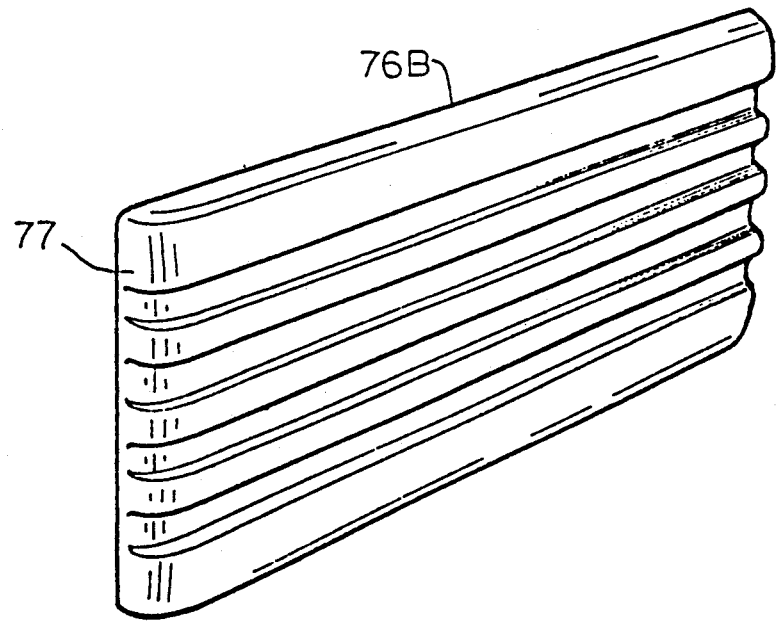
FIG. 11B shows the strip of FIG. 11A after reshaping and removal of flash to form the finished trim strip.

Referring now to FIGS. 11A and 11B, there is shown a modified configuration in which a strip 76 as extruded and cut has been formed with a corrugated construction out of foam plastic material. FIG. 11B shows the strip 76 after reshaping to form a finished trim strip 76B with the end 77 reshaped to provide a curved contour with the outer skin as originally extruded extending to the back surface intended to face the vehicle. Thus, the reshaped finished trim strip 76B does not expose the cellular structure of the foam material.

Figure 12A:
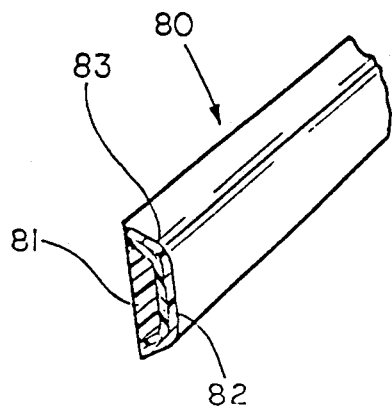
FIG. 12A is a perspective view of a different type and shape of strip as extruded but prior to reshaping with Mylar decorative layer and a clear PVC protective layer.
Figure 12B:
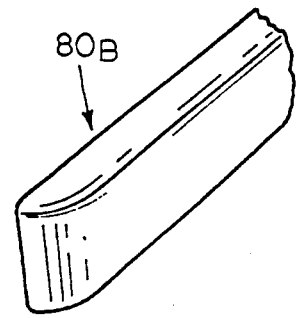
FIG. 12B shows the strip of FIG. 10A after reshaping and after removal of flash to form the finished trim strip.

Referring to FIGS. 12A and 12B, there is illustrated another strip 80 prior to reshaping. This strip has an inner structural member 81 which is extruded from a conventional extruder. Following its extrusion, a layer of decorated plastic or foil 82 is applied thereover from a separately formed roll of such decorative material. Following application of the decorative layer 82, a protective layer of clear PVC 83 may be applied. FIG. 12B shows the finished trim strip 80B following the reshaping operation. As will be appreciated, the reshaping operation causes both the decorative layer 82 and the protective layer 83 to cover the end so that the base layer 81 is not visible when the finished part is affixed to a vehicle.

The invention described herein provides a trim strip having an enhanced appearance. It has an end portion which is contoured smoothly into the main, un-reshaped portion with no appearance of a line of demarcation between the reshaped and un-reshaped portions.

Other modifications will be apparent to those skilled in the art. Accordingly, the invention will be limited in scope only by the scope of the following claims.

I claim:

1. A method of forming a bodyside molding for a vehicle from a length of extruded thermoplastic material having a substantially uniform profile in the direction of extrusion and having a first inner surface intended to face toward the vehicle and a second outer surface intended for viewing comprising the steps of:

(a) providing a first mold section having a cavity contoured with (i) a first portion substantially similar in contour to that of said second outer surface, (ii) a second portion contoured to form a closed end and (iii) a transition portion providing a smooth transition between said first and second portions.
(b) positioning said length of extruded material in said cavity with the second outer surface facing said cavity;
(c) maintaining said first mold section at a temperature below the softening temperature of said thermoplastic material;
(d) bringing a second mold section having a molding face and said length of material positioned as set forth in step (b) into contact with one another while maintaining said molding face at a temperature at least high enough to soften and reshape said length of extruded material; and
(e) compressing said second mold section against said length of extruded material to heat and reshape it into conformity with said cavity.

2. A method of forming a bodyside molding for a vehicle from a length of extruded thermoplastic material having a substantially uniform profile in the direction of extrusion and having a first inner surface intended to face toward the vehicle and a second outer surface intended for viewing comprising the steps of:
(a) providing a first mold section having a flat surface defining a plane and a cavity extending below said plane, said cavity having (i) a first portion substantially similar in contour to that of said second outer surface as extruded (ii) a second portion contoured to form a closed end and (iii) a transition portion providing a smooth transition between said first and second portions;
(b) positioning said length of extruded material in said cavity with the second outer surface facing said cavity and with the end of said length of extruded material projecting beyond the end of said second portion;
(c) maintaining said first mold section at a temperature below the softening temperature of said thermoplastic material;
(d) bringing a second mold section having a planar molding face and said length of material positioned as set forth in step (b) into contact with another while maintaining said molding face at a temperature above the melting point of said thermoplastic material;
(e) compressing said second mold section against said length of extruded material to heat and reshape it into conformity with said cavity, said second outer surface at said closed end being reshaped to extend to to the first inner surface.

3. A method of forming a bodyside molding for a vehicle from a length of extruded thermoplastic material having a substantially uniform profile in the direction of extrusion and having a first structural layer of thermoplastic material having a surface intended to face toward the vehicle and a second decorative layer of thermoplastic material having a surface intended to be viewed, at least one end of said length of material having exposed both said first structural layer and said second decorative layer comprising the steps of:
(a) providing a first mold section having a cavity contoured with (i) a first portion generally similar in contour to that of said surface to be viewed as extruded, (ii) a second portion contoured to form a closed end and (iii) a transition portion providing a smooth transition between said first and second portions;
(b) positioning said length of material in said cavity with the second decorative layer facing the surface of said cavity and with the end of said length of material projecting beyond said closed end;
(c) maintaining said first mold section at a temperature below the softening temperature of the thermoplastic material used for said second decorative layer,
(d) bringing a second mold section having a molding surface and said length of material positioned as set forth in step (b) into contact with one another while maintaining said molding surface at a temperature above the melting point of the thermoplastic material used for said first structural layer; and
(e) compressing said second mold section against said length of material to heat and reshape it into conformity with said cavity, said second decorative layer at said closed end being reshaped to extend to the surface of said first structural layer intended to face toward the vehicle and cover said first structural layer from view when said bodyside molding is affixed to a vehicle.

4. A method of forming a bodyside molding for a vehicle from a length of extruded thermoplastic material having a first substantially flat inner surface defining a plane, said inner surface intended to face toward the vehicle and a second contoured outer surface intended for viewing, said second contoured outer surface, in cross section, extending from a first end to a second end, both of said ends lying in said plane comprising the steps of:
(a) providing a first mold section having a cavity contoured with (i) a first portion substantially similar in contour of said second outer surface, (ii) a second portion contoured to form a closed end and (iii) a transition portion providing a smooth transition between said first and second portions;
(b) positioning said length of extruded material in said cavity with the second contoured outer surface facing said cavity with the end of said length of extruded material projecting beyond the end of said second portion;
(c) maintaining said first mold section at a temperature below the softening temperature of said thermoplastic material;
(d) providing a second mold section having a planar molding face;
(e) maintaining said second mold section of a temperature above the melting point of said thermoplastic material; and
(f) moving at least one of said first mold section and said second mold section into close proximity with the other while said length of material is positioned as set forth in step (b) to heat and reshape the end of said length of material into conformity with said cavity while causing said second outer surface to extend to said plane around the periphery of the newly reshaped end.

5. A method for reshaping an end portion of an extruded plastic strip having a flat side and contoured side comprising the steps of:
(a) providing a (i) first mold section having a planar face and a cavity, a portion of which is similar in contour and the rest of which is dissimilar in contour to the contour of said contoured side, said cavity including an end defining contour in said dissimilar portion, and (ii) a second mold section having a planar face;

(b) positioning a length of said plastic strip in said cavity with said contoured side facing the cavity and with its end extending beyond the end defining contour of said cavity;

(c) moving one said first and second mold sections relatively toward one another to cause the second mold section to engage said length of plastic strip;

(d) heating said second mold section and, by its contact thereagainst, heating said length of plastic strip to a temperature at which it can be reshaped while cooling said first mold section to maintain the surface of said cavity below the softening point of the plastic material forming said length of plastic strip;

(e) during step (d) urging one of said first and second mold sections toward the other to compression mold and reshape said length of plastic strip into conformity with said cavity; and (f) cooling the second mold and the reshaped plastic strip enclosed in said cavity.

6. The method as defined in any of claims 2, 3, 4 or 5 including the step of pinching and at least partially severing that portion of said length of material projecting beyond the end of said cavity.

7. The method as defined in any of claims 1, 2, 3, 4 or 5 including the step of providing a cavity in said second mold section communicating with the cavity of said first mold section when said mold sections are closed and forcing thermoplastic material into said second mold section cavity to form a projection extending from the surface of the finished bodyside molding intended to face toward the vehicle.

8. The method as defined in any of claims 1, 2, 3, 4 or 5 wherein said first mold section has a knife edge structure defining the periphery of said cavity and an overflow channel outwardly from said knife edge structure and all excess thermoplastic material exceeding the volume of said cavity during said reshaping flows into said overflow channel.

9. The method as defined in any of claims 1, 2, 3, 4 or 5 wherein said first mold section has said knife edge structure with a free end defining the periphery of said cavity, said free end lying in a first plane, the molding surface of said second mold section defining a second plane which, during reshaping is parallel to said first plane and further including the step of pinching thermoplastic material between said free end and said molding surface to at least partially sever said excess thermoplastic material from that reshaped in said cavity.

* * * * *